United States Patent
Žďárský et al.

(10) Patent No.: US 11,628,629 B2
(45) Date of Patent: Apr. 18, 2023

(54) METHOD FOR THE ULTRASONIC WELDING OF TWO PLASTIC COMPONENTS, AND PLASTIC COMPONENT PRODUCED THEREBY

(71) Applicant: Magna Exteriors (Bohemia) s.r.o., Liberec (CZ)

(72) Inventors: Radim Žďárský, Liberec (CZ); Ondřej Vohlídal, Liberec (CZ)

(73) Assignee: MAGNA EXTERIORS (BOHEMIA) S.R.O., Liberec (CZ)

( * ) Notice: Subject to any disclaimer, the term of this patent is extended or adjusted under 35 U.S.C. 154(b) by 40 days.

(21) Appl. No.: 17/144,085

(22) Filed: Jan. 7, 2021

(65) Prior Publication Data

US 2021/0213688 A1    Jul. 15, 2021

(30) Foreign Application Priority Data

Jan. 9, 2020    (DE) .......................... 102020200184.7

(51) Int. Cl.
   B29C 65/08    (2006.01)
   B29C 65/00    (2006.01)
   B29L 31/30    (2006.01)

(52) U.S. Cl.
   CPC .............. B29C 65/08 (2013.01); B29C 66/21 (2013.01); B29C 66/343 (2013.01); B29C 66/949 (2013.01); B29L 2031/3044 (2013.01)

(58) Field of Classification Search
   CPC ... B29C 65/086; B29C 66/21; B29C 66/7352; B29C 66/1122; B29L 2031/3044
   See application file for complete search history.

(56) References Cited

U.S. PATENT DOCUMENTS

| | | | | |
|---|---|---|---|---|
| 4,532,166 A | * | 7/1985 | Thomsen | B29C 66/0246 428/140 |
| 4,865,680 A | * | 9/1989 | Pierson | B29C 65/08 156/580.2 |
| 6,203,366 B1 | * | 3/2001 | Muller | B29C 66/131 439/561 |
| 6,752,886 B2 | * | 6/2004 | Distel | B29C 66/7392 156/64 |

(Continued)

FOREIGN PATENT DOCUMENTS

| | | |
|---|---|---|
| CN | 106925880 A | 7/2017 |
| DE | 10160496 A1 | 11/2002 |

(Continued)

OTHER PUBLICATIONS

DE-102018201293-A1 (Year: 2019).*

(Continued)

*Primary Examiner* — Michael W Hotchkiss
(74) *Attorney, Agent, or Firm* — Dickinson Wright PLLC

(57) ABSTRACT

The invention relates to a method for the ultrasonic welding of two plastic components using a sonotrode, wherein the energy for the welding is introduced into the plastic components via at least one or more pins of the sonotrode, wherein the two plastic components are welded to one another step by step, wherein the respectively subsequent step of the welding is carried out in a region which has already been loaded and relieved of tension as a result of the preceding step of the welding.

8 Claims, 3 Drawing Sheets

(56) References Cited

U.S. PATENT DOCUMENTS

| | | | | |
|---|---|---|---|---|
| 7,425,241 | B2* | 9/2008 | Vadot | B29C 65/081 156/73.1 |
| 7,776,171 | B2* | 8/2010 | Lehto | B29C 66/961 156/64 |
| 8,828,167 | B2* | 9/2014 | Hannon | A41D 27/245 156/73.4 |
| 9,004,578 | B1* | 4/2015 | Ghannam | G01D 11/30 296/191 |
| 9,808,883 | B2* | 11/2017 | Ballough | B29C 66/863 |
| 10,710,311 | B1* | 7/2020 | Vasko | B29C 66/61 |
| 2005/0104389 | A1* | 5/2005 | Vadot | B29C 66/61 293/117 |
| 2008/0110550 | A1* | 5/2008 | Lehto | B29C 66/21 156/73.1 |
| 2008/0182472 | A1* | 7/2008 | Ogasawara | B29C 66/7315 442/286 |
| 2009/0133803 | A1* | 5/2009 | Lehto | B29C 66/83411 156/73.1 |
| 2010/0116409 | A1* | 5/2010 | Yamamoto | B29C 66/81427 156/73.1 |
| 2010/0215923 | A1* | 8/2010 | Frost | B32B 27/12 428/196 |
| 2013/0153119 | A1* | 6/2013 | Hannon | B29C 65/5028 156/73.3 |
| 2014/0141210 | A1* | 5/2014 | Squires | B32B 7/12 428/198 |
| 2015/0041047 | A1* | 2/2015 | Wang | B23K 20/10 156/73.1 |
| 2015/0307047 | A1* | 10/2015 | Davis | B62D 25/08 293/117 |
| 2016/0354973 | A1* | 12/2016 | Ralph | B29C 66/21 |
| 2016/0354974 | A1* | 12/2016 | Wang | B29C 66/1122 |
| 2018/0141279 | A1* | 5/2018 | Rousseau | B29C 65/081 |
| 2020/0016841 | A1* | 1/2020 | Regenberg | B29C 66/21 |
| 2020/0016843 | A1* | 1/2020 | Mayer | B29C 66/81431 |
| 2020/0282661 | A1* | 9/2020 | Mayer | B29C 66/7486 |
| 2021/0129453 | A1* | 5/2021 | Wang | B29C 66/71 |

FOREIGN PATENT DOCUMENTS

| | | | |
|---|---|---|---|
| DE | 102007034412 A1 | 1/2009 | |
| DE | 102008059142 A1 * | 6/2010 | B29C 65/72 |
| DE | 102008059142 A1 | 6/2010 | |
| DE | 102013223166 A1 | 5/2015 | |
| DE | 202017104190 U1 * | 10/2018 | B29C 66/006 |
| DE | 102017116803 A1 * | 1/2019 | B29C 66/69 |
| DE | 102018010143 A1 | 7/2019 | |
| DE | 102018201293 A1 * | 8/2019 | B29C 66/91231 |
| DE | 102018201293 A1 | 8/2019 | |
| EP | 1867462 B1 * | 11/2014 | B29C 65/7826 |
| JP | 2011031516 A | 2/2011 | |
| KR | 20120025831 A | 3/2012 | |
| WO | 2019145482 A1 | 8/2019 | |

OTHER PUBLICATIONS

DE-102008059142-A1 (Year: 2010).*
DE-102017116803-A1 Machine Translation (Year: 2019).*
DE-202017104190-U1 Machine Translation (Year: 2018).*
EP-1867462-B1 Machine Translation (Year: 2014).*
German Search Report from the German Patent Office for related German Application No. 102020200184.7 dated May 26, 2020.
Chinese Office Action and Search Report from the Chinese Patent Office for related Chinese Application Serial No. 202110024293.7 dated Jul. 5, 2022, 15 pages.

* cited by examiner

METHOD FOR THE ULTRASONIC WELDING OF TWO PLASTIC COMPONENTS, AND PLASTIC COMPONENT PRODUCED THEREBY

CROSS-REFERENCE TO RELATED APPLICATIONS

This application claims priority to German Patent Application No. 102020200184.7, filed Jan. 9, 2020, the entire disclosure of which is incorporated herein by reference.

FIELD OF THE INVENTION

The invention relates to a method for the ultrasonic welding of two plastic components using a sonotrode, wherein the energy for the welding is introduced into the plastic components via one or more pins of the sonotrode.

The invention also relates to plastic components which are produced in accordance with the method.

BACKGROUND OF THE INVENTION

This section provides information related to the present disclosure which is not necessarily prior art.

PRIOR ART

Bumpers having receptacles for ultrasound sensors for parking aids and parking assist systems and radar sensors are increasingly being produced.

DE 10 2007 034 412 A1 discloses a device, intended for a vehicle, for monitoring a distance of the vehicle from an object by means of a sensor, configured in particular as an ultrasound sensor, for measuring distances, which has a mount that can be fixed in a bodyshell region of the motor vehicle, in particular to a plastic part, such as for example a bumper, by means of a support surface and accommodates the sensor. Also disclosed is an ultrasonic welding method for fixing the device, and also a bodyshell component of plastic and a sensor which can be fixed thereto.

This device is already used frequently under the designation "Park Pilot" or "Park Distance Control". In these known systems, distance sensors installed in the rear or front bumper detect possible objects located behind the vehicle by means of ultrasound pulses in accordance with the echo sounding principle. The sensor signals are evaluated in an evaluation and control device which calculates the distance to the closest identified object. As soon as the calculation is obtained that an obstacle is at a distance of less than, for example, 1.2 m from the vehicle, a warning signal to the driver of the vehicle in the form of an intermittent sound signal takes place. The pause between individual sounds of the warning signal becomes shorter as the obstacle is approached, until the warning signal transitions into a continuous sound at a distance of 30 cm. At the same time, the distance can be indicated visually on a multicoloured display which is mounted in the rear of the vehicle.

Since the mounts, as variants of the large-area component, that is to say the bumper, have to be fitted, they are not immediately moulded but rather welded to the large-area base component in accordance with requirements.

Furthermore, it is also known to fasten the mount to the bodyshell by means of an ultrasonic welding method. For this purpose, the corresponding surfaces of the support surface and also of the bodyshell region are configured as smooth surfaces in order to thus form the contact surfaces as large as possible. It has proven to be disadvantageous here, however, that the visual appearance can be adversely affected by the energy input when the contact surface is being melted on the visible side of the bodyshell region.

DE 10 2013 223 166 A1 discloses a sonotrode for ultrasonic welding which has a contact surface and at least two elevations protruding from the contact surface.

DE 10 2008 059 142 A1 discloses a method for the continuous joining of components. In this case, the sonotrode is guided along a line and the components are thus melted and pressed together.

DE 10 2018 202 293 A1 discloses that directed spot welds can be created by means of a sonotrode by moving the sonotrode along the weld seam to be realized.

Sound is induced by the at least two protruding elevations or pins. In this way, a locationally precise sound induction is ensured which is largely independent of component tolerances or positioning inaccuracies that may be present. Undesired weld terminations in the edge regions of the sonotrode and/or of the component or workpiece can thus be avoided.

During the welding process, the sonotrode is placed onto the workpiece such that a central longitudinal axis of the sonotrode runs perpendicular to the surface of the workpiece. Oscillations are thus induced perpendicularly into the workpiece, i.e. the components to be welded, in the direction of the central longitudinal axis of the sonotrode.

SUMMARY OF THE INVENTION

This section provides a general summary of the disclosure, and is not a comprehensive disclosure of its full scope or all of its features.

It is an object of the invention to propose an optimized ultrasonic welding method which minimizes the existing problems by virtue of a low energy input.

The object is achieved by a method for the ultrasonic welding of two plastic components using a sonotrode, wherein the energy for welding is introduced into the plastic components via at least two pins of the sonotrode, wherein the two plastic components are welded to one another step by step, wherein the respectively subsequent step of the welding is carried out in a region which has already been loaded and relieved of tension as a result of the preceding step of the welding.

A very good bond along with low energy input is possible by virtue of the step-by-step welding.

In this case, the individual steps of the welding are performed spatially close to one another along a weld path. The distance is predefined by the energy introduced, which determines the region of manipulation of the material.

It is necessary here that the individual steps of the welding follow one another at a time interval, which makes it possible to relieve the material of the plastic components of tension in the region of a weld.

In the process, the sonotrode is guided along the weld path.

The weld path extends linearly, circularly, or such that it follows any desired contour.

In this case, the pins of the sonotrode can be placed flat or with a tip or with another specific contour on the plastic components to be welded.

The plastic components are bumpers and mounts for sensors, reinforcing parts and other parts with a relatively thin wall thickness, which are intended to be welded to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention will be described below by way of example with reference to the appended drawing.

DESCRIPTION OF THE INVENTION

Figure 1:
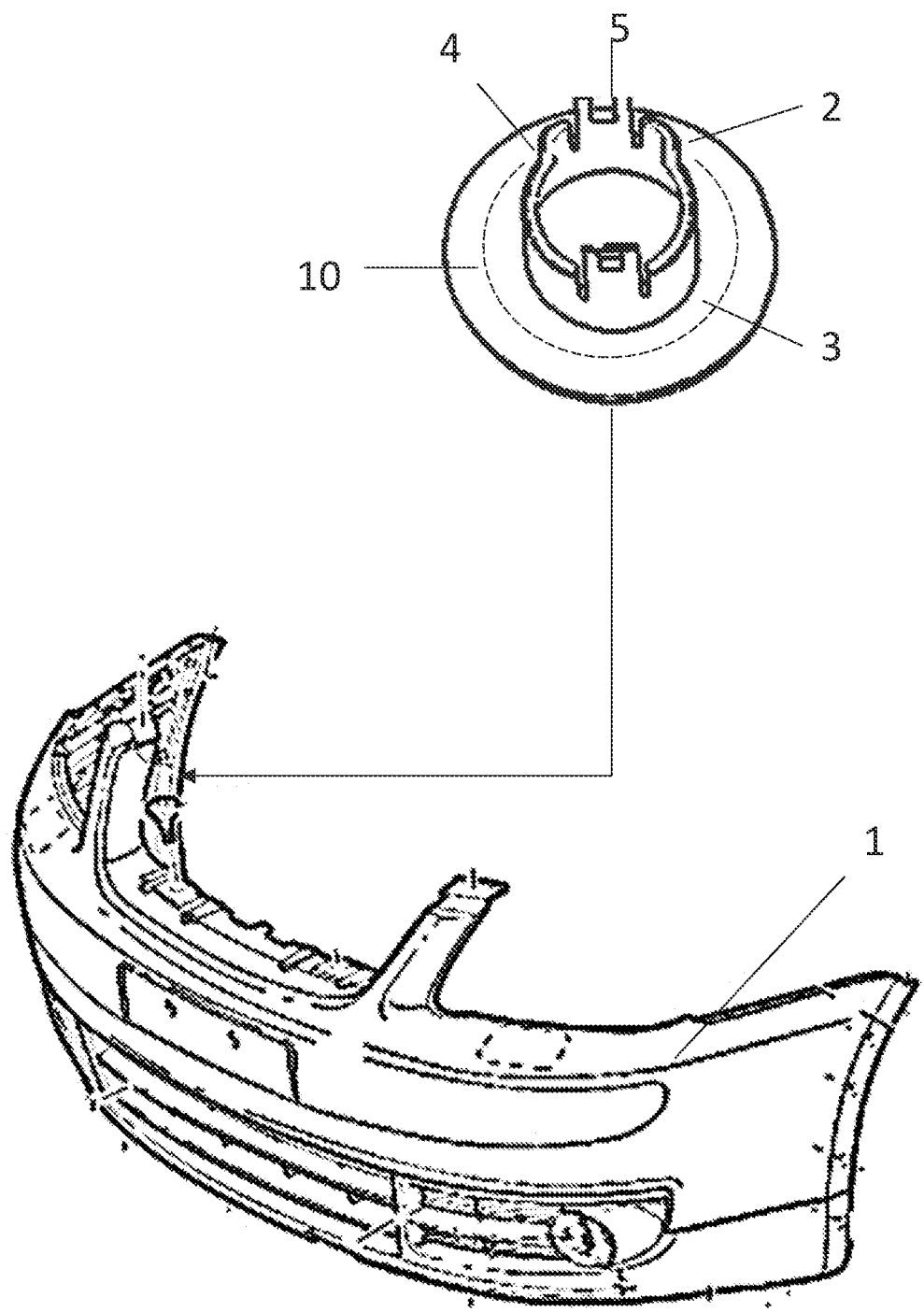
FIG. 1 shows a schematic illustration of a bumper at the front.

FIG. 1 shows an exemplary embodiment with an exemplary bumper 1, as it is used in the front of a vehicle.

Mounts 2 for different sensors are fastened on that side of the bumper 1 which faces the vehicle. The mount 2 illustrated by way of example has in this case an annular support surface 3 and also a cylindrical receptacle 4. A sensor is plugged into the receptacle 4 and locked by way of the tabs 5 attached to the receptacle.

The support surface 3 can in this case of course also be of a square or rectangular, as well as asymmetric, configuration in order to ensure a precise determination of the relative position of the mount 2 on the bumper 1. A possible weld path 10 is indicated as a circular path.

Figure 2:
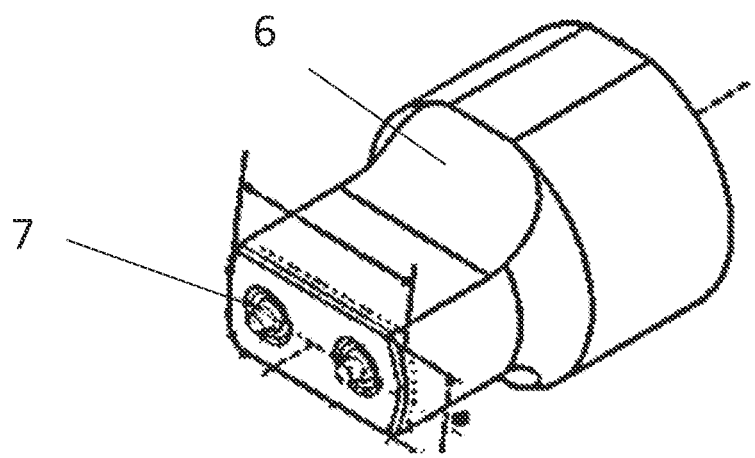
FIG. 2 shows a sonotrode in the prior art.

The method according to the invention makes use of ultrasonic welding using a sonotrode 6, as is illustrated by way of example in FIG. 2. In this exemplary embodiment, the sonotrode 6 has two pins 7.

The mount 2 is spot-welded to the bumper 1 at the two pins 7 via such a sonotrode 6. A diameter of 0.8 to 1.4 mm has proven to be an optimum pin size in this case.

In the example of a bumper, the mount is produced from polypropylene with talc.

The welding operation is performed in this case step by step via a movement of the sonotrode 6 along the support surface 3 of the mount 2. In the example of FIG. 1, the sonotrode is moved along a circular line in the region of the annular support surface 3.

Figure 4:
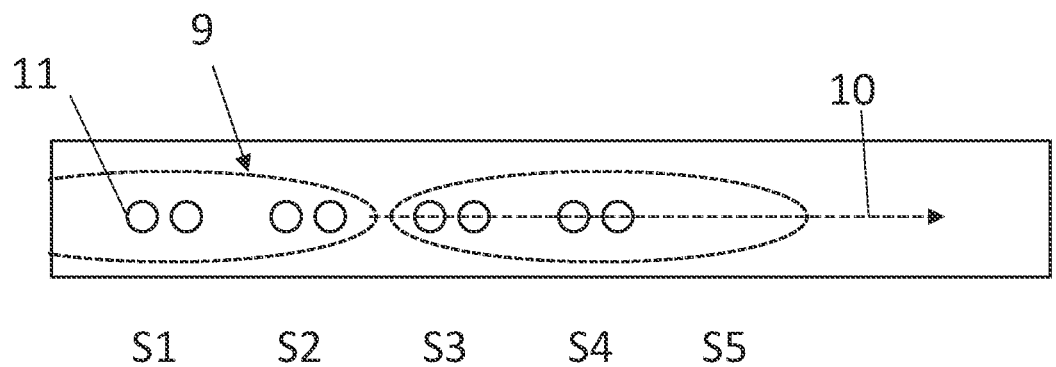
FIG. 4 shows an exemplary weld path.

A linear weld path is illustrated in FIG. 4. The weld points 11 are placed in pairs by virtue of the use of a sonotrode with two pins. Welding step S2 takes place after welding step S1, etc. For welding step S1, a region of the energy manipulation 9 is identified in a similar manner in welding step S4.

In this case, after the first step of the welding, e.g. S1, the next step S2 takes place in a region 9 of the plastic element which was subjected already to a specific load as a result of the first welding step S1 and is in the tension-relieved state again. That is to say that, for the second welding step S2, less energy, stress and heat manipulation has to be applied than for S1, since the material has not yet completely cooled and hardened again. The step-by-step welding introduces integrally less energy into the components to be welded.

In this respect, a certain time interval has to be present between the individual welding steps S1, S2 . . . , in order to allow the material to be relieved of tension.

To carry out the method, the sonotrode 6 is moved mechanically along the weld path 10. This is realized by a suitable electric motor or a pneumatic drive or by a robot arm. The time needed to move the sonotrode over the workpiece is sufficient to allow the recovery process of the last weld to progress as far as possible.

The sonotrode 6 used has a pin here, but can also have 4, 5, 6, 7 or 8 pins.

Figure 3:
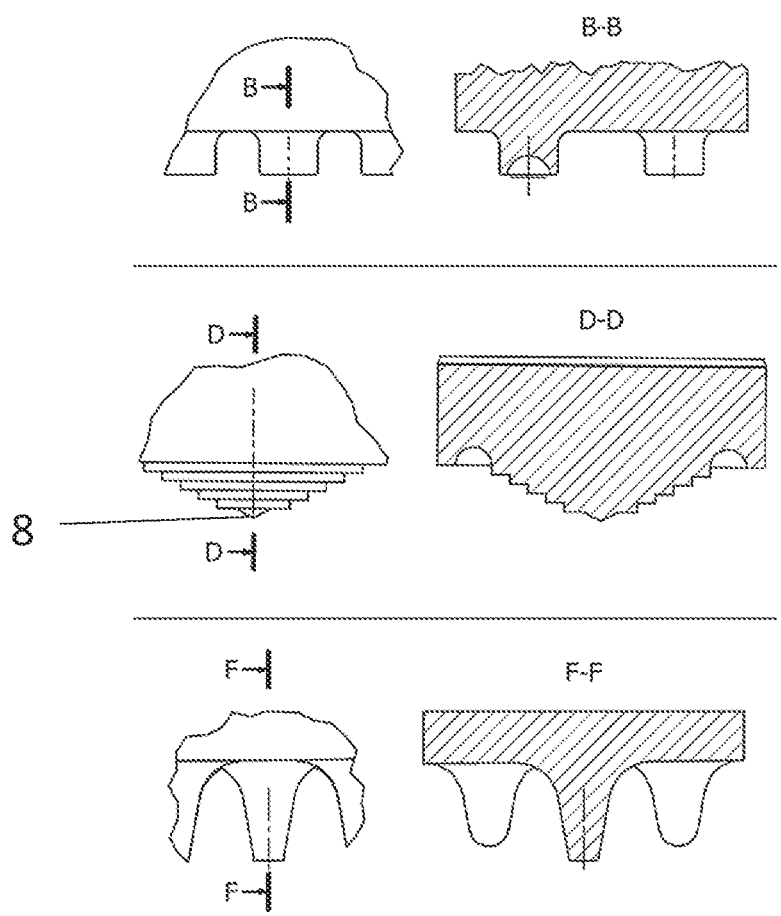
FIG. 3 shows exemplary embodiments for sonotrodes.

Examples of different embodiments of the pins 7 are illustrated in FIG. 3. It can be seen here that the sonotrode 6 has either flat pins 7 which have a direct plane of contact with the support surface 3, or, as illustrated in the middle example, make contact with the support surface 3 in a tip 8.

The energy input is between 200-600 W of power output by the generator for the individual weld point.

By way of example, the distance between the individual weld points should be at least 5 mm, wherein the time interval of the placing of the weld points is determined by the mechanical options, but is preferably under 1 second.

LIST OF REFERENCE SIGNS

1 Bumper
2 Mount
3 Support surface
4 Receptacle
5 Tabs
6 Sonotrode
7 Pins
8 Tip
9 Region
10 Weld path
11 Weld point

The invention claimed is:

1. A method for ultrasonic welding a plastic sensor mount to a plastic bumper of a vehicle, comprising:

moving a sonotrode between a plurality of welding locations along a weld path defined along a region where the plastic sensor mount overlies the plastic bumper, wherein the welding locations are spaced from one another by distances of at least 5 mm, and wherein the sonotrode is moved between the welding locations at time intervals of less than one second;

spot welding the plastic sensor mount to the plastic bumper via at least one pin of the sonotrode at each of the plurality of locations with a power output of the sonotrode set at between 200 W and 600 W;

whereby the distance of at least 5 mm, the time interval of less than one second and the power output of between 200 W and 600 W relieve tension in the plastic materials of the sensor mount and bumper at adjacent subsequent welding locations.

2. The method according to claim 1, wherein the sonotrode is mechanically guided along the weld path.

3. The method according to claim 1, wherein the weld path extends linearly or circularly.

4. The method according to claim 1, wherein the at least one pin of the sonotrode terminates at either a flat or pointed end for engaging different contours on the plastic components to be welded.

5. The method according to claim 1, wherein the sonotrode is mechanically moved with at least one of an electric motor, a pneumatic drive and a robot arm.

6. The method in according to claim 1 wherein the sensor mount has a ring-shaped support surface, and wherein the weld path extends in a circle shape along the support surface.

7. The method according to claim 1, wherein the at least one pin of the sonotrode has a diameter of 0.8 to 1.4 mm.

8. The method according to claim 1, wherein the sensor mount is made of a polypropylene with talc.

\* \* \* \* \*